(12) United States Patent
Lawson

(10) Patent No.: US 11,220,946 B1
(45) Date of Patent: Jan. 11, 2022

(54) EXHAUST GAS HEAT RECOVERY SYSTEM HAVING A THERMOSIPHON HEAT TRANSFER CIRCUIT WITH AN ACCUMULATOR

(71) Applicant: FORD GLOBAL TECHNOLOGIES, LLC, Dearborn, MI (US)

(72) Inventor: Ian Lawson, Albany, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/945,075

(22) Filed: Jul. 31, 2020

(51) Int. Cl.
*F01N 5/02* (2006.01)
*F02G 5/02* (2006.01)
*F01P 3/20* (2006.01)

(52) U.S. Cl.
CPC .............. *F01N 5/02* (2013.01); *F01P 3/20* (2013.01); *F02G 5/02* (2013.01); *F01N 2240/02* (2013.01)

(58) Field of Classification Search
CPC ............. F01N 5/02; F01P 3/20–2285; F01P 2003/2214–2292
See application file for complete search history.

(56) References Cited

U.S. PATENT DOCUMENTS

| | | | | |
|---|---|---|---|---|
| 4,775,102 A | * | 10/1988 | Negishi | B60H 1/20 165/104.14 |
| 4,974,667 A | * | 12/1990 | Sun | B60H 1/025 165/274 |
| 5,082,174 A | * | 1/1992 | Joji | B60H 1/20 165/104.11 |
| 2007/0079622 A1 | * | 4/2007 | Bradley | F01P 3/22 62/244 |
| 2008/0190101 A1 | * | 8/2008 | Miyagawa | F28D 15/0266 60/320 |
| 2013/0199164 A1 | * | 8/2013 | Levin | B60H 1/20 60/299 |
| 2014/0283506 A1 | * | 9/2014 | Kuroki | F28D 15/0275 60/320 |
| 2016/0334148 A1 | * | 11/2016 | Rubitschek | F02G 5/02 |
| 2016/0334170 A1 | * | 11/2016 | Grenz | F02G 5/00 |
| 2017/0120725 A1 | | 5/2017 | Zhou et al. | |

FOREIGN PATENT DOCUMENTS

| | | | | |
|---|---|---|---|---|
| DE | 3821138 A1 | * | 3/1989 | ............... F01N 5/02 |
| DE | 102009050068 A1 | * | 4/2011 | ............... F02G 5/00 |
| DE | 102016100916 A1 | * | 7/2016 | ............. F01K 15/02 |
| WO | WO-2014206708 A1 | * | 12/2014 | ............... F01N 5/02 |

* cited by examiner

*Primary Examiner* — Laert Dounis
(74) *Attorney, Agent, or Firm* — David B. Kelley; Brooks Kushman P.C.

(57) ABSTRACT

A vehicle includes an internal combustion engine, a cooling loop, an exhaust system, and a thermosiphon. The cooling loop is configured to direct an engine coolant through the engine. The exhaust system is configured to direct exhaust gas away from the engine. The thermosiphon is configured to transfer heat from the exhaust gas to the engine coolant.

19 Claims, 3 Drawing Sheets

EXHAUST GAS HEAT RECOVERY SYSTEM HAVING A THERMOSIPHON HEAT TRANSFER CIRCUIT WITH AN ACCUMULATOR

TECHNICAL FIELD

The present disclosure relates to systems for recovering heat from exhaust systems of internal combustion engines.

BACKGROUND

Internal combustion engines include an exhaust system that is configured to direct exhaust gas out the combustion chambers and to the ambient surroundings.

SUMMARY

A vehicle includes an internal combustion engine, a cooling loop, an exhaust system, and a thermosiphon. The cooling loop is configured to direct an engine coolant through the engine. The exhaust system is configured to direct exhaust gas away from the engine. The thermosiphon is configured to transfer heat from the exhaust gas to the engine coolant. The thermosiphon has a first heat exchanger, a second heat exchanger, a fluid circuit, and an accumulator. The first heat exchanger is configured to transfer heat from the engine exhaust to a working fluid. The second heat exchanger is configured to transfer heat from the working fluid to the engine coolant. The fluid circuit is configured to transport the working fluid between the first and second heat exchangers. The accumulator is configured to receive the working fluid from the fluid circuit and to regulate the pressure of the working fluid. A saturated pressure of the working fluid at a desired temperature of the engine coolant corresponds to the accumulator being fully charged.

A thermosiphon that is configured to transfer heat from exhaust gas to a coolant of an internal combustion engine includes an evaporator, a condenser, a fluid circuit, and an accumulator. The evaporator is configured to transfer heat from the engine exhaust gas to a working fluid. The condenser is configured to transfer heat from the working fluid to the engine coolant. The fluid circuit is configured to transport the working fluid between the evaporator and condenser. The accumulator is configured to receive the working fluid from the fluid circuit and to regulate the pressure of the working fluid.

An exhaust gas heat recovery system for an internal combustion engine includes a first heat exchanger, a second heat exchanger, a fluid circuit, and an accumulator. The first heat exchanger is configured to transfer heat from the engine exhaust gas to a working fluid. The second heat exchanger is configured to transfer heat from the working fluid to an engine coolant. The fluid circuit is configured to transport the working fluid between the first and second heat exchangers. The accumulator is configured to receive the working fluid from the fluid circuit and to regulate the pressure of the working fluid. A saturated pressure of the working fluid at a desired temperature of the engine coolant corresponds to the accumulator being fully charged.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
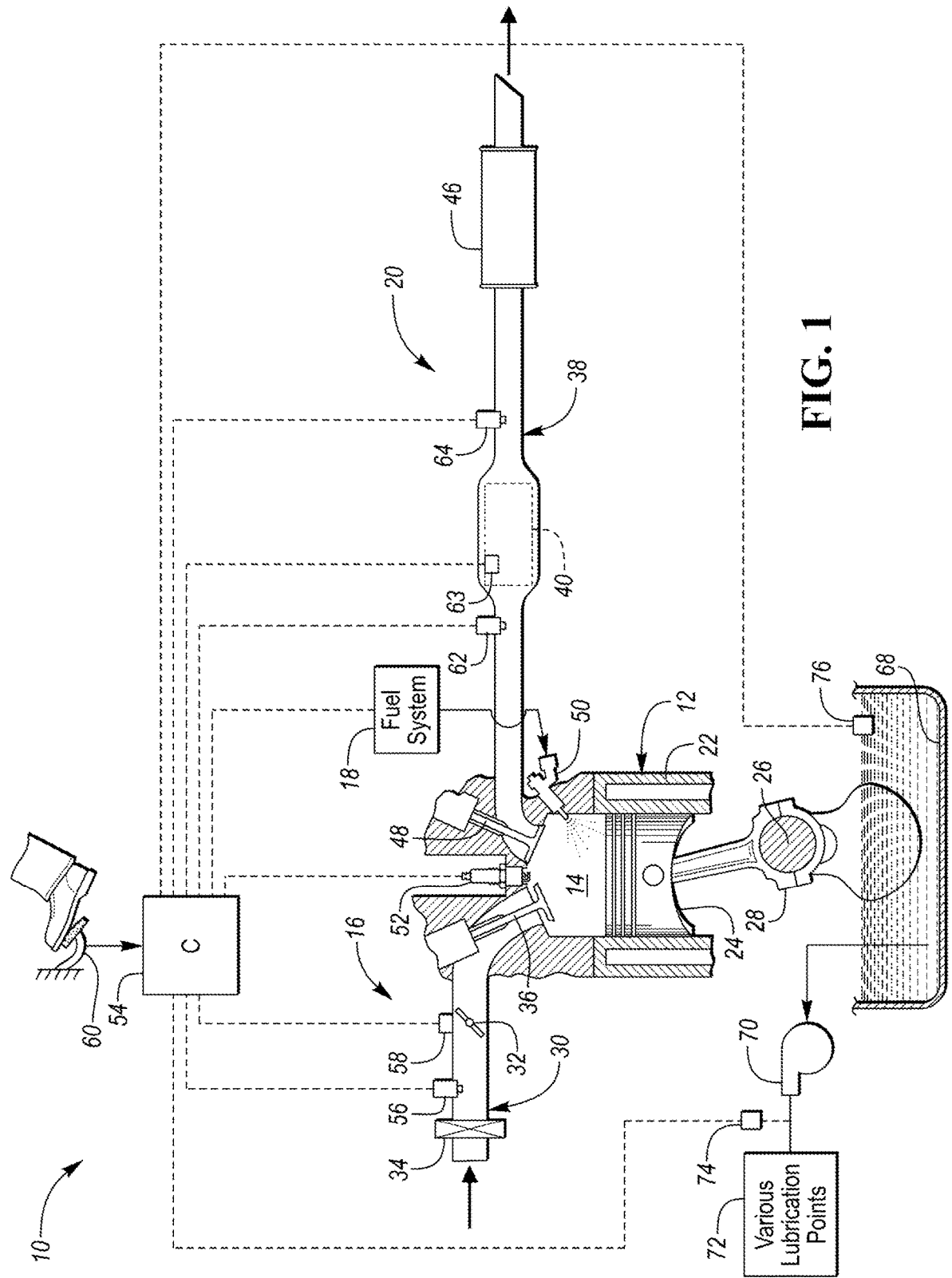
FIG. 1 is a schematic illustration of a vehicle having an internal combustion engine.

Referring to FIG. 1, a vehicle 10 and an internal combustion engine 12 and an associated exhaust system 20 are illustrated. The schematic of FIG. 1 illustrates a single cylinder 14 of the internal combustion engine 12, an air intake system 16, a fuel delivery system 18, and an exhaust system 20. It should be understood that the single cylinder 14 illustrated in FIG. 1 may be representative of one or more cylinders 14 of the engine 12. It should further be understood, that the air intake system 16 and fuel delivery system 18 illustrated in FIG. 1 are representative of the systems that deliver air and fuel, respectively, to all of the cylinders 14 of the engine 12, while the exhaust system 20 illustrated in FIG. 1 is representative of the system that channels exhaust gas away from all of the cylinders 14 of the engine 12.

The engine 12 includes an engine block 22 that defines each of the cylinders 14. A piston 24 is disposed within each of the cylinders 14. The pistons 24 are configured to transfer the energy that results from combusting fuel within each cylinder 14 into kinetic energy, which is utilized to rotate a crankshaft 26. Each piston 24 is connected to the crankshaft 26 via a connecting rod 28. The crankshaft 26 then transfers the rotational energy to one or more drive wheels (not shown) of the vehicle 10 in order to propel the vehicle 10. Intermediate components, such as driveshafts, a torque converter, a transmission gearbox, universal joints, differentials, etc. may be disposed between the crankshaft 26 and the drive wheels. The intermediate components are configured to transfer the rotational power of the crankshaft 26 to the drive wheels.

The air intake system 16 includes one or more manifolds, pipes, ducts, or conduits 30 that are configured to channel air from the ambient surroundings and into the cylinders 14. The amount of air that is being channeled into the cylinders 14 may be controlled by a throttle valve 32. An air filter 34 may be disposed proximate to the intake of the air intake system 16. Each of the cylinders 14 includes an air intake valve 36 is that is configured to establish fluid communication between the cylinder 14 and the air intake system 16 when in an opened position and isolate the cylinder 14 from the air intake system 16 when in a closed position. The air intake valve 36 of each cylinder 14 will be in an opened position during the intake stroke of the respective piston 24 and closed during the compression, combustion, and exhaust strokes of the respective piston 24.

The exhaust system 20 includes one or more manifolds, pipes, ducts, or conduits 38 that are configured to channel exhaust gas away from the cylinders 14 and to the ambient surroundings. The exhaust system 20 includes a catalyst 40 (or catalytic converter) that is configured to reduce the amount of emissions (e.g., $NO_x$ gases or unspent hydrocarbons) in the exhaust gas that is channeled to the ambient air or surroundings. The exhaust system 20 may further include a muffler 46 that is configured to reduce noise. The muffler 46 may be downstream of the catalyst 40. Each of the cylinders 14 includes an exhaust valve 48 is that is configured to establish fluid communication between the cylinder 14 and the exhaust system 20 when in an opened position and isolate the cylinder 14 from the exhaust system 20 when in a closed position. The exhaust valve 48 of each cylinder 14 will be in an opened position during the exhaust stroke of the respective piston 24 and closed during the intake, compression, and combustion strokes of the respective piston 24.

One or more camshafts (not shown) may be configured to open and close the air intake valve 36 and exhaust valve 48 of each cylinder 14. The camshafts may be connected to the crankshaft 26 by a gearing arrangement, belted arrangement, or some other arrangement to ensure that the air intake valves 36 and exhaust valves 48 are opening and closing when necessary. More specifically, the connection between the crankshaft 26 and the one or more camshafts will ensure that the air intake valve 36 of each cylinder 14 is in the opened position during the intake stroke of the respective piston 24 and closed during the compression, combustion, and exhaust strokes of the respective piston 24. The connection between the crankshaft 26 and the one or more camshafts will also ensure that the exhaust valve 48 of each cylinder 14 is in the opened position during the exhaust stroke of the respective piston 24 and closed during the intake, compression, and combustion strokes of the respective piston 24.

The catalyst 40 may include rhodium, cerium, and platinum or palladium as reactive agents. The rhodium is configured to reduce the amount $NO_x$ gases (combinations of nitrogen and oxygen such NO, $NO_2$, etc.) that are present within the exhaust. More specifically, the rhodium is configured to convert the $NO_x$ gases into nitrogen ($N_2$) and oxygen ($O_2$) by reacting the $NO_x$ gases with oxygen. The platinum or palladium is configured to reduce the amount of unspent hydrocarbons (e.g., $C_8H_{18}$ or $C_1H_4$) that are present within the exhaust. More specifically, the platinum or palladium is configured to convert the hydrocarbons into carbon dioxide ($CO_2$) and water ($H_2O$) by reacting the hydrocarbons with oxygen. The rhodium may also reduce the amount of unspent hydrocarbons within the exhaust, however, the rhodium may be primarily utilized to reduce the amount of amount $NO_x$ gases that are present within the exhaust. The platinum or palladium may also reduce the amount of amount $NO_x$ gases that are present within the exhaust, however, the platinum or palladium may be primarily utilized to reduce the amount of unspent hydrocarbons that are present within the exhaust. The cerium acts to store oxygen, which is then supplied to the rhodium and the platinum or palladium to effect the reactions described above to convert $NO_x$ gases into nitrogen ($N_2$) and oxygen ($O_2$) and to convert the unspent hydrocarbons into carbon dioxide ($CO_2$) and water ($H_2O$).

The fuel delivery system 18 is configured to deliver fuel to each of the cylinders 14. More specifically, the fuel delivery system may include a fuel tank for storing fuel, conduits that establish fluid communication between the fuel tank and fuel injectors 50, and a fuel pump that is configured to direct the fuel from the fuel tank, through the conduits, and to each of the fuel injectors 50. Each cylinder 14 also includes a spark plug 52 that is configured to ignite the air and fuel mixture that is within the cylinder 14 and push down on the respective piston 24 during the power stroke of the cylinder 14.

The vehicle 10 includes a controller 54, which may be a powertrain control unit (PCU). While illustrated as one controller, the controller 54 may be part of a larger control system and may be controlled by various other controllers throughout the vehicle 10, such as a vehicle system controller (VSC). It should therefore be understood that the controller 54 and one or more other controllers can collectively be referred to as a "controller" that controls various components of the vehicle 10 in response to signals from various sensors to control functions such as, selecting or scheduling shifts of a vehicle transmission, adjusting the air-fuel mixture being delivered to the engine 12, etc.

The controller 54 may include a microprocessor or central processing unit (CPU) that is in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 in controlling the engine 12 or subcomponents of the vehicle 10.

The controller 54 may be configured to increase or decrease the power output of the engine 12. More specifically, the controller 54 may be configured to increase or decrease the power output of the engine 12 by increasing or decreasing the airflow and fuel flow into each cylinder 14. The airflow may be increased by adjusting the throttle valve 32 towards a fully open position or decreased by adjusting the throttle valve towards a fully closed position. The fuel flow may be increased by opening the fuel injectors 50 for longer periods of time during each injection of fuel into the cylinder 14 or decreased by opening the fuel injectors 50 for shorter periods of time during each injection of fuel into the cylinder 14. The controller 54 may also increase or decrease the power output of the engine 12 by either retarding or advancing the spark timing of the spark plugs 52.

A mass airflow sensor 56 may be configured to measure the amount of air flowing into the air intake system 16, which is eventually delivered to the cylinders 14, and communicate the amount of air flowing into the air intake system 16 to the controller 54. A throttle position sensor 58 may be configured to communicate the position of the throttle valve 32 to the controller 54. The controller 54 may also be in communication with each of the spark plugs 52, the fuel system 18, and each of the fuel injectors 50. Based on a power demand that is delivered to the controller 54, the controller may adjust the throttle valve 32 position to increase or decrease airflow into the cylinders 14, adjust the timing of the spark plugs 52, and/or adjust the amount of fuel being delivered into the cylinders 14 to either increase or decrease the power output of the engine 12 to meet the power demand. The power demand may be input into the controller 54 by an operator of the vehicle 10 when the operator engages an accelerator pedal 60. Under certain circumstances the power demand may be based on a pre-setting that is stored as control logic within the controller 54. For example, if the vehicle operator is not depressing the accelerator pedal 60 and the engine 12 is on, the amount of power the engine 12 is producing may be adjusted to a preset idle value.

Also, depending on power demand or for emission control purposes, the engine 12 may be configured to operate at a stoichiometric air-fuel mass ratio, a lean air-fuel mass ratio, or a rich air-fuel mass ratio. The air-fuel mass ratio may simply be referred to as the air-fuel ratio. Stoichiometric air-fuel mass ratio has a value of 14.7 to 1. A rich air-fuel mass ratio will be less than 14.7 to 1 and a lean air-fuel mass ration will be greater than 14.7 to 1.

A first oxygen sensor 62 may be disposed within the conduits 38 of the exhaust system 20 between the cylinders 14 and upstream of the catalyst 40. The first oxygen sensor 62 is configured to measure the amount of oxygen (02) that is within the exhaust gas exiting the cylinder 14. Based on the measured amount oxygen in the exhaust gas, the first oxygen sensor 62 generates a signal that correlates with the air-fuel mass ratio that the engine 12 is operating at. The signal generated by the first oxygen sensor 62 may indicative of a lean, stoichiometric, or rich current air-fuel mass ratio. The first oxygen sensor 62 communicates the air-fuel ratio measurement to the controller 54, which provides a feedback control to the controller 54. The feedback control may include adjusting the air and/or fuel flowing (i.e., flow rates) into the cylinders 14 via the controller 54 if the air-fuel mass ratio measured by the first oxygen sensor 62 is different than the air-fuel mass ratio that is being commanded to the engine 12. More specifically, the feedback control may include adjusting the air and/or fuel flowing into the cylinders 14 to drive the air-fuel mass ratio that is being measured by the first oxygen sensor 62 toward the air-fuel mass ratio that is being commanded to the engine 12.

A second oxygen sensor 64, which has the same functionality as the first oxygen sensor 62, may be disposed within the conduits 38 of the exhaust system 20 downstream of the catalyst 40. The second oxygen sensor 64 is utilized to determine the efficiency at which the first catalyst 40 reduces the amount of emissions within the exhaust gas. The second oxygen sensor 64 is configured to communicate a signal that correlates with air-fuel mass ratio of the exhaust gas back to the controller 54, after the exhaust gas has passed through the catalyst 40.

One or more temperature sensors 63 may configured to measure the temperature of the catalyst 40. The temperature sensors 63 are configured to communicate a signal that correlates with a measured temperature of the catalyst 40 back to the controller 54.

The engine 12 also includes an oil pan or sump 68. An oil pump 70 is configured to direct oil out of the sump 68 and towards various lubrication points 72, such as any of the bearings, journals, valve stems, or any of the other moving parts within the engine 12. A pressure sensor 74 may be configured to measure the pressure of the oil that is being output from the oil pump 70. The pressure sensor 74 may then communicate the oil pressure to the controller 54. An oil level sensor 76 may be configured to measure the level of the oil within the pan or sump 68. The oil level sensor 76 may then communicate the level of the oil to the controller 54.

Figure 2:
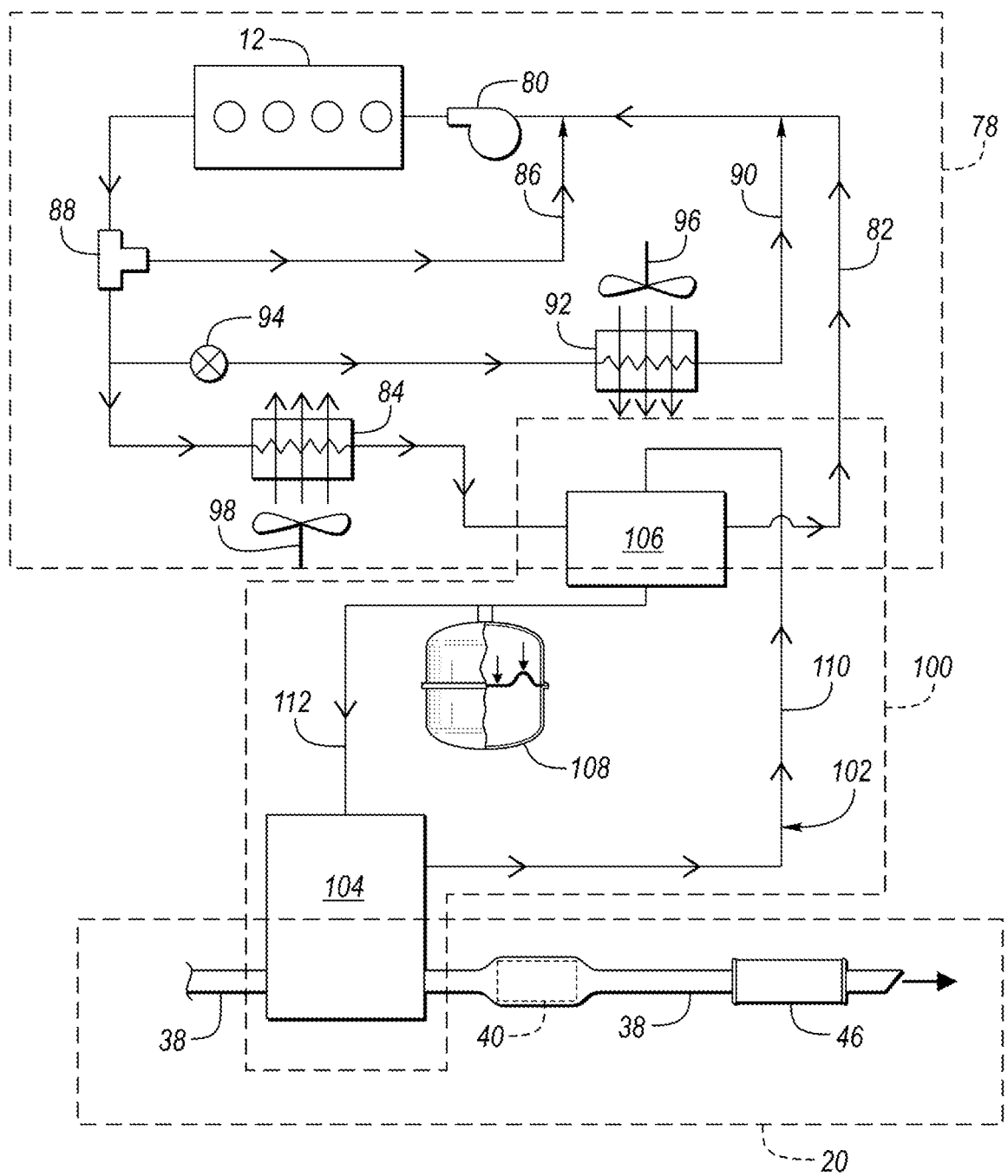
FIG. 2 is a schematic illustration of an exhaust gas heat recovery system for the internal combustion engine.

Referring to FIG. 2, a schematic illustration of an exhaust gas heat recovery system for the internal combustion engine 12 is illustrated. The engine 12 includes an engine cooling system 78. The engine cooling system includes tube or pipes that are configured to circulate a coolant, such as glycol, through the engine 12 in order to remove excess heat. Subcomponents of the engine 12, such as the engine block and head, define voids, known as jackets, that are in fluid communication with the tubes or pipes. The jackets are configured to circulate water around components of the engine 12 that produce or experience the majority of the heat generated by combustion, such as the cylinders and valves of the engine.

The engine cooling system 78 includes a pump 80 that is configured to circulate the coolant through tubes, pipes, water jackets, etc. The tubes or pipes of the engine cooling system 78 may form a first cooling loop 82 that includes the engine 12 and a first heat exchanger 84, such as a radiator, that is configured to reject the excess heat generated by the engine 12 to the ambient surroundings. The tubes or pipes of the engine cooling system 78 may form a second cooling loop 86 that is configured to bypass the first heat exchanger 84. This may be desirable if the engine coolant is below a desired temperature and needs to be quickly heated to the desired temperature. A thermostat 88 may control whether the coolant is the flowing through the first cooling loop 82 or the second cooling loop 86 based on the temperature of the coolant flowing through the engine cooling system 78.

A third cooling loop 90 may be configured to direct coolant to a second heat exchanger 92, such as a heater core, when an operator of the vehicle has requested heating within a cabin of the vehicle via a control panel. Such a control panel may be in communication with the controller 54. A valve 94 may be configured to open and close to control or restrict the flow of the coolant through the third cooling loop 90. A first fan 96 may be configured to direct air across the second heat exchanger 92. The valve 94 and the first fan 96 may be in communication with the controller 54 and may be operated based on the operator command to heat the cabin or the vehicle, or may be operated based on control logic that requires that additional heat be removed from the engine cooling system 78. A second fan 98 may also be configured to direct air across the first heat exchanger 84 in the event the coolant requires additional cooling. Various sensors that are disposed along the engine cooling system 78 may be configured to communicate the temperature of the coolant back the controller 54. The controller 54 may include control logic that is configured to turn the second fan 98 on or off based on the temperature of the coolant.

The exhaust gas heat recovery system for the internal combustion engine 12 includes a thermosiphon 100 that is configured to transfer heat from the exhaust gas from the exhaust gas system 20 of the engine 12 to the engine coolant flowing through the engine cooling system 78. The thermosiphon 100 includes a fluid circuit 102, a first heat exchanger 104, a second heat exchanger 106, and an accumulator 108. The fluid circuit is configured to transport the working fluid between the first second heat exchanger 104 and the second heat exchanger 106. The first heat exchanger 104 is configured to transfer heat from the engine exhaust in the exhaust gas system 20 of the engine 12 to a working fluid flowing through the fluid circuit 102. The first heat exchanger 104 may be an evaporator. The second heat exchanger 106 is configured to transfer heat from the working fluid flowing through the fluid circuit 102 to the engine coolant flowing through the engine cooling system 78. The second heat exchanger 106 may be a condenser. The second heat exchanger 106 is shown to transfer heat from the working fluid flowing through the fluid circuit 102 to the first cooling loop 82 of the engine cooling system 78. It should be understood, however, the position of the second heat exchanger 106 may be adjusted such that the second heat exchanger 106 transfers heat from the working fluid flowing through the fluid circuit 102 to the second cooling loop 86, third cooling loop 90, or any other cooling loop that is part of an engine cooling system 78.

The thermosiphon 100 may contain a two-phase working fluid (i.e., a fluid that transitions between a liquid and gaseous phase). The thermosiphon 100 may be dependent on gravity and circulation may facilitated by significant density differences between the vapor and liquid phases of the working fluid. Spatially, the second heat exchanger 106 (e.g., the condenser) may be disposed at a higher elevation relative to the first heat exchanger 104 (e.g., the evaporator). Circulation may begin when sufficient heat is supplied to the first heat exchanger 104 to evaporate the working fluid. The working fluid in vapor form then rises to the second heat exchanger 106, where the vapor condenses and then returns to the first heat exchanger 104 as a liquid to repeat the cycle. The process will continue as long as sufficient heat is supplied to the first heat exchanger 104 for vaporization and as long as sufficient heat is picked up at the second heat exchanger 106 to facilitate condensation. Using latent heat, (from the phase change) rather than sensible heat (from a temperature increase) contributes to a low achievable thermal resistance.

The accumulator 108 of the thermosiphon 100 is configured to receive the working fluid from the fluid circuit 102 in liquid form and to regulate the pressure of the working fluid within the fluid circuit 102. More specifically, the accumulator 108 may include a biasing element that regulates the pressure of the working fluid within the fluid circuit 102. The biasing element may include a gas spring that is pre-charged to a desired pressure. The biasing element may also include a piston or a diaphragm that is operated by the gas spring to control the working fluid. A saturated pressure of the working fluid at a desired temperature of the engine coolant corresponds to the accumulator 108 being fully charged (i.e., the accumulator being filled to capacity with the liquid form of the working fluid). The accumulator 108 may be disposed on fluid circuit 102 on an outlet side of the second heat exchanger 106 (e.g., a condenser).

The working fluid is configured to transfer heat when the temperature of the engine coolant is below a desired operating temperature of the engine coolant. Under such a scenario, the thermosiphon 100 may said to be in an "on" condition. More specifically, when the temperature of the engine coolant is below a desired operating temperature, the vapor pressure of the working fluid will be less and the pre-charge pressure of the biasing element, resulting in the piston or a diaphragm within the accumulator 108 forcing the working fluid to flow through the fluid circuit 102. While the working fluid is flowing through the fluid circuit 102 under such a scenario, a vapor form of the working fluid will flow in a first pipe or tube 110 of the fluid circuit 102 from the first heat exchanger 104 to second heat exchanger 106, while a liquid form or condensate form of the working fluid will flow in a second pipe or tube 112 of the fluid circuit 102 from the second heat exchanger 106 to the first heat exchanger 104.

The pre-charge pressure of the biasing element within the accumulator 108 is selected such that when the accumulator 108 is full of the liquid form of the working fluid: the working fluid is saturated having a liquid form in the accumulator and a vapor form in the first pipe or tube 110, second pipe or tube 112, first heat exchanger 104, and second heat exchanger 106; the saturated temperature of the working fluid is equal to the desired temperature engine coolant; and the saturated pressure of the working fluid is equal to the pre-charge pressure of the biasing element. Pre-charging the pressure of the biasing element within the accumulator 108 to such a selected value stops or significantly reduces heat transfer within the thermosiphon 100, once the working fluid reaches the desired temperature of the engine coolant, since only a vapor form of the working fluid will remain in the first pipe or tube 110, second pipe or tube 112, first heat exchanger 104, and second heat exchanger 106, and since the vapor form of the working fluid will not circulate while the accumulator 108 remains static (i.e., while the biasing element within the accumulator 108 is not forcing the working fluid back into the fluid circuit 112). Under such a scenario, the thermosiphon 100 may said to be in an "off" condition. While the pressure and temperature of the working fluid within the thermosiphon 100 are rising before reaching the desired temperature of the engine coolant, which typically occurs after an engine start due to the increasing temperature of the engine coolant, the accumulator 108 pressure equalizes (i.e., becomes saturated), and the portion of the working fluid that is in liquid or condensate form collects within the accumulator 108.

If the second heat exchanger 106 temperature falls below the desired temperature of the engine coolant (the desired temperature of the engine coolant being equal to the saturated temperature of the working fluid if the accumulator is fully charged) the pressure of the working fluid within the thermosiphon 100 will drop as the vapor of the working fluid condenses into liquid form, the biasing element within accumulator 108 will equalize the pressure within the thermosiphon 100 and force working fluid back into the system, restarting the thermosiphon 100. Under such a scenario, the thermosiphon 100 may said to be transitioning from the "off" condition to the "on" condition.

Referring to 3A-3C, varying positions of a diaphragm 111 that is disposed within the accumulator 108 are illustrated. The diaphragm 111 and a gas spring 112 operate to form the biasing element that controls the working fluid within the thermosiphon 100. The diaphragm 111 forms a barrier between a fillable volume 114 and the gas spring 112. The fillable volume 114 is open to and in fluid communication with the fluid circuit 102, or more specifically is open to and in fluid communication with the second pipe or tube 112.

Figure 3A:
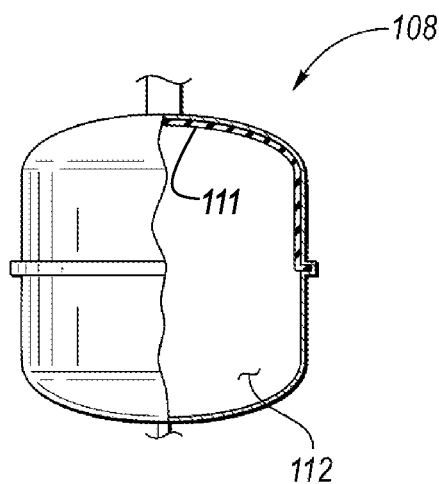
FIGS. 3A-3C illustrate varying positions of a diaphragm that forms a barrier between a fillable volume and a gas spring within an accumulator that is utilized by the exhaust gas heat recovery system.
Figure 3B:
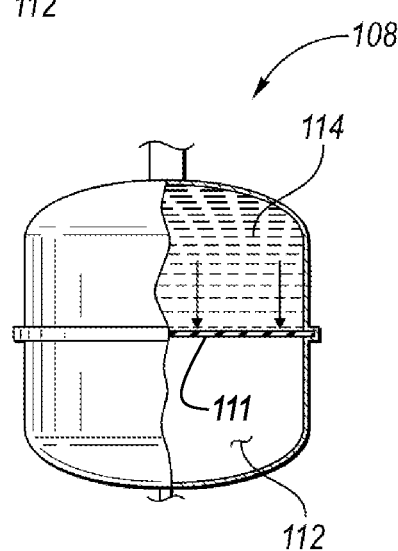
Figure 3C:
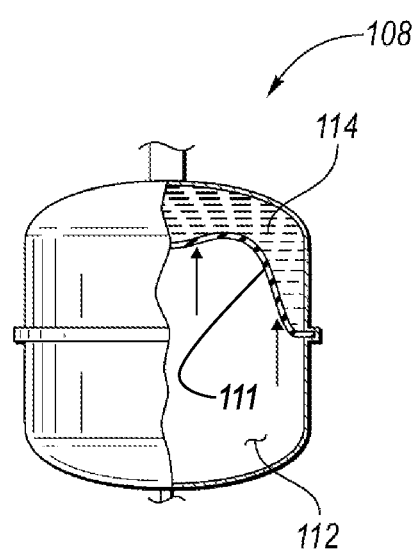

FIG. 3A illustrates a fully advanced position of the biasing element (i.e., fully advanced positions of the diaphragm 111 and the gas spring 112 such that the fillable volume 114 is empty). FIG. 3B illustrates a fully retracted position of the biasing element (i.e., fully retracted positions of the diaphragm 111 and the gas spring 112 such that the fillable volume 114 is completely filled with a liquid form of the working fluid). FIG. 3C illustrates an intermediate position of the biasing element (i.e., positions of the diaphragm 111 and the gas spring 112 that are in between the fully advanced and fully retracted positions such that the fillable volume 114 is partially filled with a liquid form of the working fluid).

The image in FIG. 3C may be representative of a condition where the accumulator 108 is either being filled or drained of the liquid form of the working fluid. The biasing element (e.g., the diaphragm 111 and the gas spring 112) is configured to advance such that the working fluid flows out of the accumulator 108 in response to a decrease in the pressure of the working fluid away the saturated pressure of the working fluid at the desired temperature of the engine coolant, which coincides with a decrease in the temperature of the working fluid to less than or away from the desired temperature of the engine coolant. The biasing element (e.g., the diaphragm 111 and the gas spring 112) is configured to retract such that the working fluid flows into the accumulator 108 in response to an increase in the pressure of the working fluid toward the saturated pressure of the working fluid at the desired temperature of the engine coolant, which coincides with an increase in the temperature of the working fluid toward the desired temperature of the engine coolant.

It should be understood that this disclosure should not be construed as limited to a biasing element that includes a diaphragm and gas spring. Other biasing elements that are configured to operate in the same manner describe herein should also be construed as disclosed herein. For example, the biasing element may be a piston and a gas spring or may be a piston and a mechanical spring that is rated to operate in the same manner described herein.

The words used in the specification are words of description rather than of limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an internal combustion engine;
    a cooling loop configured to direct an engine coolant through the engine;
    an exhaust system configured to direct exhaust gas away from the engine; and
    a thermosiphon configured to transfer heat from the exhaust gas to the engine coolant, the thermosiphon having,
        a first heat exchanger configured to transfer heat from the engine exhaust to a working fluid,
        a second heat exchanger configured to transfer heat from the working fluid to the engine coolant,
        a fluid circuit configured to transport the working fluid between the first and second heat exchangers, and
        an accumulator configured to receive the working fluid from the fluid circuit and regulate a pressure of the working fluid, wherein a saturated pressure of the working fluid at a desired temperature of the engine coolant corresponds to the accumulator being fully charged.

2. The vehicle of claim 1, wherein the accumulator includes a biasing element that is configured to retract such that the working fluid flows into the accumulator in response to an increase in the pressure of the working fluid toward the saturated pressure of the working fluid at the desired temperature of the engine coolant.

3. The vehicle of claim 2, wherein the biasing element is configured to advance such that the working fluid flows out of the accumulator in response to a decrease in the pressure of the working fluid away from the saturated pressure of the working fluid at the desired temperature of the engine coolant.

4. The vehicle of claim 2, wherein the biasing element is comprised of a diaphragm and a gas spring that are disposed within the accumulator.

5. The vehicle of claim 1, wherein the first heat exchanger is an evaporator.

6. The vehicle of claim 5, wherein the second heat exchanger is a condenser.

7. The vehicle of claim 6, wherein the accumulator is disposed on the fluid circuit on an outlet side of the condenser.

8. A thermosiphon configured to transfer heat from an engine exhaust gas to a coolant of an internal combustion engine comprising:
    an evaporator configured to transfer heat from the engine exhaust gas to a working fluid;
    a condenser configured to transfer heat from the working fluid to the engine coolant;
    a fluid circuit configured to transport the working fluid between the evaporator and the condenser; and
    an accumulator configured to receive the working fluid from the fluid circuit and to regulate a pressure of the working fluid, wherein a saturated pressure of the working fluid at a desired temperature of the engine coolant corresponds to the accumulator being fully charged.

9. The thermosiphon of claim 8, wherein the accumulator includes a biasing element that is configured to retract such that the working fluid flows into the accumulator in response to an increase in the pressure of the working fluid toward the saturated pressure of the working fluid at the desired temperature of the engine coolant.

10. The thermosiphon of claim 9, wherein the biasing element is configured to advance such that the working fluid flows out of the accumulator in response to a decrease in the pressure of the working fluid away from the saturated pressure of the working fluid at the desired temperature of the engine coolant.

11. The thermosiphon of claim 9, wherein the biasing element is comprised of a diaphragm and a gas spring that are disposed within the accumulator.

12. The thermosiphon of claim 8, wherein the accumulator is disposed on the fluid circuit on an outlet side of the condenser.

13. An exhaust gas heat recovery system for an internal combustion engine comprising:
    a first heat exchanger configured to transfer heat from an engine exhaust gas to a working fluid;
    a second heat exchanger configured to transfer heat from the working fluid to an engine coolant;
    a fluid circuit configured to transport the working fluid between the first and second heat exchangers; and
    an accumulator configured to receive the working fluid from the fluid circuit and regulate a pressure of the working fluid, wherein a saturated pressure of the working fluid at a desired temperature of the engine coolant corresponds to the accumulator being fully charged.

14. The system of claim 13, wherein the accumulator includes a biasing element that is configured to retract such that the working fluid flows into the accumulator in response to an increase in the pressure of the working fluid toward the saturated pressure of the working fluid at the desired temperature of the engine coolant.

15. The system of claim 14, wherein the biasing element is configured to advance such that the working fluid flows out of the accumulator in response to a decrease in the pressure of the working fluid away from the saturated pressure of the working fluid at the desired temperature of the engine coolant.

16. The system of claim 14, wherein the biasing element is comprised of a diaphragm and a gas spring that are disposed within the accumulator.

17. The system of claim 13, wherein the first heat exchanger is an evaporator.

18. The system of claim 17, wherein the second heat exchanger is a condenser.

19. The system of claim 18, wherein the accumulator is disposed on the fluid circuit on an outlet side of the condenser.

\* \* \* \* \*